May 14, 1963   W. D. LUDWIG ETAL   3,089,503
SHUTTLE VALVE WITH DETENT MEANS
Filed Sept. 22, 1961   2 Sheets-Sheet 1

INVENTORS
WALTER D. LUDWIG
BY WALTER J. BOWMAN

Donnelly, Mentag & Harrington
ATTORNEYS

INVENTORS
WALTER D. LUDWIG
WALTER J. BOWMAN
BY
ATTORNEYS

United States Patent Office
3,089,503
Patented May 14, 1963

3,089,503
SHUTTLE VALVE WITH DETENT MEANS
Walter D. Ludwig, Bloomfield Township, Oakland County, and Walter J. Bowman, Detroit, Mich., assignors to Mechanical Air Controls, Inc., Detroit, Mich., a corporation of Michigan
Filed Sept. 22, 1961, Ser. No. 139,992
3 Claims. (Cl. 137—111)

This invention relates to improvements in air valves, and more particularly to a novel variable pressure detent means for use in controlling the operation of a shuttle valve of a press safety valve.

It is conventional practice to provide presses, and the like, with safety valves which are connected in the pressure fluid supply line, for operating a press clutch, brake or the like. Such safety valves incorporate a pair of master flow control valves which are connected in parallel so as to feed the operating pressure fluid through a pair of parallel conduits which are adapted to feed into the opposite ends of a press inlet shuttle valve or poppet valve, whereby the shuttle valve is held in a balanced or centered position when both of the master flow control valves are functioning correctly, and wherein when one of the master flow control valves fails, the pressure fluid from the remaining operative master flow control valve will unbalance the shuttle valve and the shuttle valve will be moved in one direction or the other to block the flow of operating pressure fluid from the remaining operative master flow control valve and exhaust it to the atmosphere, and in so doing also operate an alarm to indicate the failure. In practice, if the two master flow control valves do not operate at absolutely identical times, the pressure balance on the shuttle valve is upset and in many instances the shuttle valve will be moved from the balanced or centered condition and operate the alarm when there has been no failure. Furthermore, such safety valves are used over a broad range of pressure applications, as for example, from applications where the pressure may vary from twenty pounds per square inch to one hundred and fifty pounds per square inch, and under such conditions it is necessary that the shuttle valve stay in its centered or balanced position without moving to the failure indicating position when a failure has not actually occurred. Furthermore, it has been found that for applications where the supply line pressure varies, the shuttle valves have a tendency to flutter, and this is a disadvantage. Accordingly, it is the primary object of the present invention to provide a novel and improved variable pressure detent means for use in conjunction with the shuttle valve of a press safety valve so as to provide the shuttle valve with a dampening or compensating mechanism to aid the shuttle valve in performing its function in a normal manner without fluttering, and without being actuated into a false, failure indicating position.

It is another object of the present invention to provide a variable pressure detent means which may be built into one end of the shuttle valve of a press safety valve, and which will be sensitive at any operating pressure.

It is still another object of the present invention to provide a variable pressure detent means for use with the shuttle valve of a press safety valve which incorporates a pair of parallel connected master flow control valves, and which detent means will compensate for any slight variation in the operation of the two parallel connected master flow control valves, and wherein such compensating action will vary from low operating pressures to high operating pressures and the detent will restrain flutter equally well at high and low pressures.

It is still another object of the present invention to provide a shuttle valve variable pressure detent means which is simple and compact in construction, economical of manufacture and efficient in operation.

Other objects, features and advantages of this invention will be apparent from the following detailed description and appended claims, reference being had to the accompanying drawings forming a part of the specification wherein like reference numerals designate corresponding parts of the several views.

Figure 1:
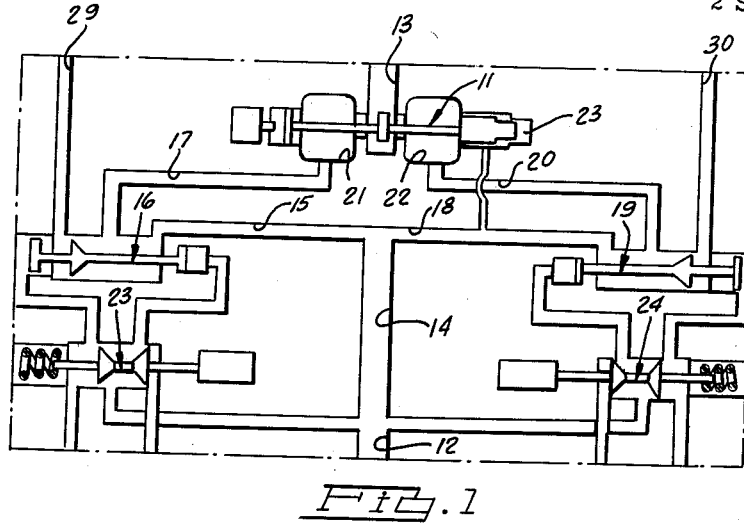
FIG. 1 is a schematic flow diagram of a press safety valve of the type having a shuttle valve which can be provided with a variable pressure detent means made in accordance with the principles of the present invention.
Figure 2:
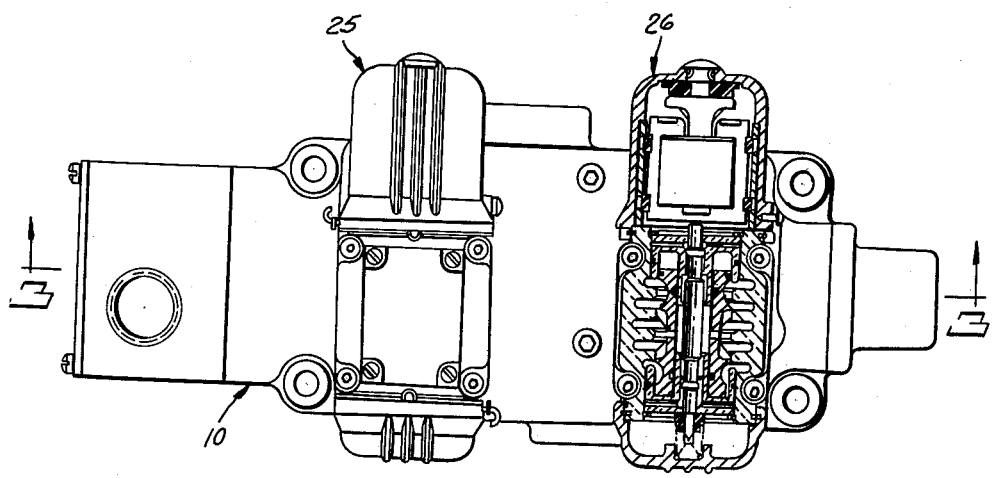
FIG. 2 is a top plan view of an illustrative press safety valve which is provided with the detent means of the present invention and which shows a longitudinal section of one of the pair of master flow control valves.
Figure 3:
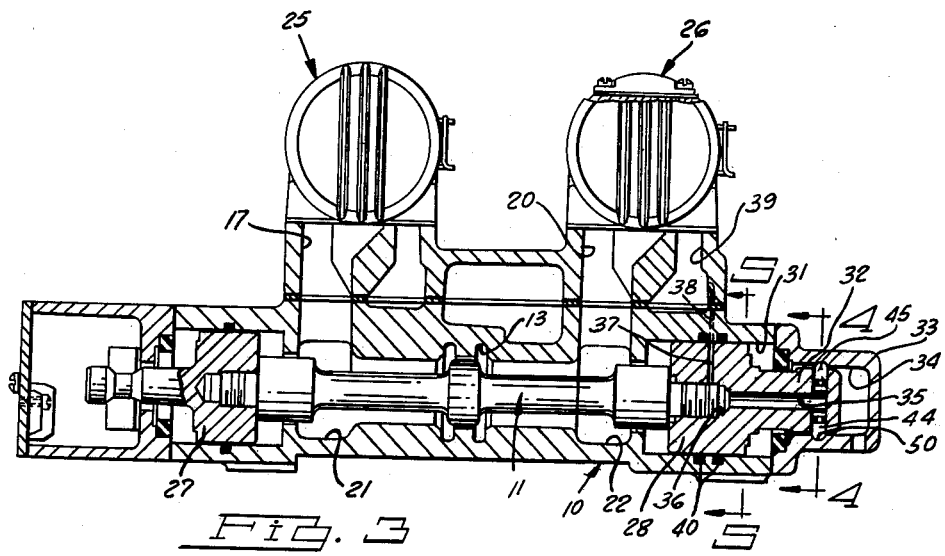
FIG. 3 is an elevational view of the structure illustrated in FIG. 2, partly in section, and taken substantially along the line 3—3 of FIG. 2, and looking in the direction of the arrows.

Referring now to the drawings and in particular to FIGS. 1, 2 and 3, wherein is shown an illustrative embodiment of a press safety valve incorporating the novel variable pressure detent means of the present invention, the numeral 10 generally indicates the base member of the press valve in which is operatively mounted the shuttle valve generally indicated by the numeral 11. Press safety valves of this type are available on the market, and a valve of this type is available from the Mechanical Air Controls, Inc. of Detroit, Michigan under Model No. 1275. A press safety valve of the type incorporating a shuttle valve which may be provided with a variable pressure detent means of the present invention is also illustrated in the patent application of Walter D. Ludwig, entitled Press Safety Valve, Serial No. 849,554, filed in the United States Patent Office on October 29, 1959 and now Patent No. 3,051,187.

As shown in FIG. 1, the press safety valve is provided with a fluid pressure inlet 12 and a fluid pressure outlet 13. The flow of fluid under pressure out of the valve and into the pressure is controlled by the shuttle valve 11 whereby, when the shuttle valve 11 is maintained in the centered position shown in FIGS. 1 and 3, the fluid will exit through the outlet 13 and the press may be operated. As shown in FIG. 1, the fluid under pressure is passed through the press safety valve by two parallel paths. A first path carries the pressure fluid through the conduit 14 to the conduit 15, through the flow valve 16 and the conduit 17 and into the shuttle valve chamber 21. The second path of the pressure fluid through the press safety valve comprises the conduit 14, the conduit 18, the flow control valve 19 and the conduit 20 which connects to the shuttle valve chamber portion 22. The flow control valves 16 and 19 are fluid operated, and the fluid for operating these valves is controlled by a pilot valve as indicated by the numerals 23 and 24. The pilot valves 23 and 24 are operated by any suitable means as by a solenoid in one direction and a spring in the other direction. The flow valve 16 and pilot valve 23 are incorporated in one master flow control valve generally indicated by the numeral 25. The flow valve 19 and the pilot valve 24 are incorporated in a master flow control valve generally indicated by the numeral 26. The master flow control valves 25 and 26 are of any suitable type, and a valve suitable for carrying out the function of such a valve is shown and described in detail in the co-pending patent application of Walter D. Ludwig, entitled Compound Valve and filed July 17, 1958 in the United States Office under Serial No. 749,212.

Figure 4:
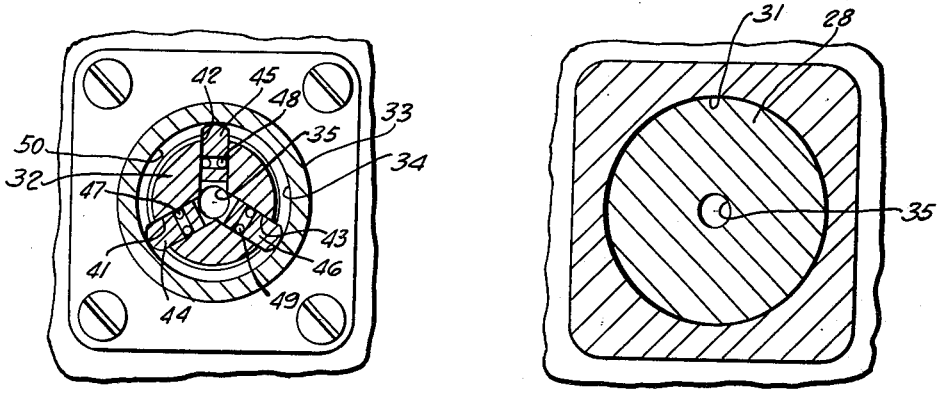
FIG. 4 is an enlarged, fragmentary, elevational sectional view of the structure illustrated in FIG. 3, taken along the line 4—4 thereof and looking in the direction of the arrows; and, FIG. 5 is an enlarged, fragmentary, elevational sectional view of the structure illustrated in FIG. 3, taken along the line 5—5 thereof and looking in the direction of the arrows.
Figure 5:
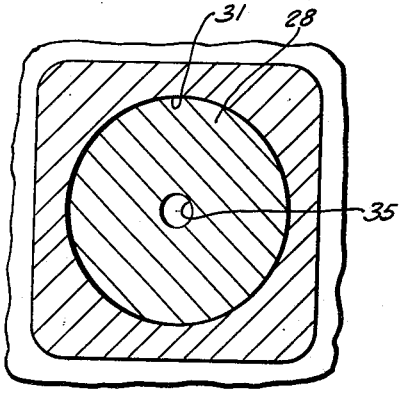

It will be seen that if either one of the master flow control valves 25 or 26 fails, the fluid pressure in the feed lines 17 and 20 will be cut off, whereby the pressure acting on one of the shuttle valve pistons 27 and 28 will also be cut off and the shuttle valve will be unbalanced and moved in one direction or the other so as to close off the outlet conduit 13 and dump the air from the remaining operative master flow control valve into the exit conduits 29 or 30. When the master flow control valves 25 and 26 are functioning properly, the air pressures exerted on the shuttle valve pistons 27 and 28 are equal and the shuttle valve 11 is maintained in the centered position shown in FIG. 3. Press valves of the type illustrated are adapted for use under high pressure and low pressure conditions, and it is necessary that the shuttle valve 11 be operative so as to stay centered in the position shown in FIG. 3 under all operative pressure conditions. As a practical matter, the master flow control valves 25 and 26 do not always operate at the same identical time, and such lack of simultaneous operation causes the shuttle valve 11 to flutter and this is a disadvantage. FIGS. 3, 4 and 5 show the shuttle valve 11 provided with the variable pressure detent means made in accordance with the principles of the present invention.

As shown in FIGS. 3, 4 and 5, the shuttle valve piston 28 is slidably mounted in the chamber 31, and this piston is provided with an axial outwardly extended reduced portion 32. The shuttle valve piston reduced portion 32 extends axially outwardly into a detent housing 33 which is provided with a circular chamber 34. The piston 28 is provided with an axial bore 35 which extends into the reduced portion and which communicates at the inner end thereof with an enlarged bore 36.

As shown in FIG. 3, the shuttle valve piston 28 is provided with the radially extended conduit 37 which communicates at the inner end thereof with the enlarged bore 36, and which terminates at the outer end thereof at the periphery of the piston 28. When the shuttle valve 11 is in the centered position shown in FIG. 3, the conduit 37 is aligned with the conduit 38 in the valve housing, and this conduit leads into the fluid pressure supply chamber 39 of the master flow control valve 26. It will be seen that the conduit 38 is always supplied with fluid under pressure from the chamber 39. The shuttle valve piston 28 is sealed against leakage of the air under pressure by means of the pair of sealing O-rings 40 which are disposed on opposite sides of the pressure conduit 38.

As shown in FIGS. 3 and 4, the reduced axial piston extension 32 is provided at the outer end thereof with the three radially disposed bores 41, 42 and 43 which communicate at the inner end thereof with the axial bore 35 and which terminate at the outer end thereof at the periphery of the piston extension 32. As shown in FIG. 4, each of these radial bores has slidably mounted therein a detent piston as 44, 45 and 46. These detent pistons are provided with suitable sealing means as indicated by the numerals 47, 48 and 49. The detent housing 33 is provided with the annual detent groove 50 which is formed in the inner chamber wall 34 and which is adapted to receive the outer rounded ends of the detent pistons 44, 45 and 46. The detent groove 50 is preferably V-shaped in cross section.

The detent pistons 44, 45 and 46 ride in the middle of the groove 50 during the normal operation of the shuttle valve 11, and they are moved outwardly into this groove by means of a radially directed air pressure or fluid pressure which enters from the valve inlet chamber 39 and passes through the conduits 36, 37 and 38 and into the bore 35. The outward radial force exerted on the detent pistons 44, 45 and 46 is proportional to the pressure of the operating fluid so that the pressure on these pistons goes up and the force gets greater as the operating pressure in the feed chamber 39 goes up. It will be seen that the fluid pressure is available to the bottom area of the detent pistons when the shuttle valve is centered, so that based on their diameter and the operating air pressure, a certain force is created at any given air pressure to prevent accidental shifting of the shuttle valve either to the right or to the left as viewed in FIG. 3. The detent pistons function to prevent super-sensitivity of the shuttle valve, yet permit the shuttle valve to operate in a fail safe manner. The detent pistons are spaced 120° apart. When either of the master flow control valves 25 or 26 fails, the differential force of the air pressure exerted on either the shuttle valve pistons 27 or 28 is strong enough to overcome any detent action provided by the detent pistons. It will be seen that when the shuttle valve is displaced to the right or to the left as viewed in FIG. 3, a 3-way valve action takes place and the air will be dumped from the axial bore 35 from behind the detent pistons 44, 45 and 46, because the conduit 37 in the piston 28 will be moved to the right or to the left of the sealing means 40, whereby the air will flow out along the side of the piston 28 so as to permit the shuttle 11 to be quickly and easily centered again after one or the other of the master flow control valves failure has been corrected. It will be seen that the piston 28 blocks the fluid pressure inlet conduit 38 when the shuttle valve 11 is moved to an unbalanced position whereby the shuttle valve may be easily and quickly moved to the balanced position after the failure has been corrected.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What we claim is:

1. In a safety valve of the type having a pair of inlet pressure fluid chambers and a base provided with the pressure fluid inlet and in which is operatively mounted a shuttle valve including a spool provided with a centrally mounted valve head and a piston of equal area at each end for engagement by fluid under pressure provided by said fluid chambers, to maintain the shuttle valve in a central operative balanced position, said valve including an outlet closable by said valve head when it is moved from said balanced central position, a variable pressure detent means comprising, a detent housing connected to said base and having a detent groove formed therein; an extension on one of said pistons projecting into said detent housing; said piston and extension being provided with a pressure fluid passage; a plurality of radially disposed detent pistons slidably mounted in said piston extension and having the outer ends thereof engageable with the groove in said detent housing; the inner end of said detent pistons communicating with the inner end of said pressure fluid passage; and, the outer end of said pressure fluid passage being aligned with a conduit connected to the pressure fluid inlet when the shuttle valve is in the central balanced position to conduct pressure fluid to the inner ends of the detent pistons to move them radially outwardly into detent engaging action with the groove in the detent housing.

2. In a safety valve of the type having a pair of inlet pressure fluid chambers and a base provided with the pressure fluid inlet and in which is operatively mounted a shuttle valve including a spool provided with a centrally mounted valve head and a piston of equal area at each end for engagement by fluid under pressure provided by said fluid chambers, to maintain the shuttle valve in a central operative balanced position, said valve including an outlet closable by said valve head when it is moved from said balanced central position, a variable detent means comprising, a pressure detent housing connected to said base; an annular chamber in said detent housing having a groove in the wall thereof; an extension on one of said pistons projecting into said detent housing chamber; said piston and extension being provided with a pressure fluid passage; a plurality of radially disposed detent pistons slidably mounted in said piston extension and having the outer ends thereof engageable in said groove in said detent housing chamber wall; said detent pistons being provided with sealing means; the inner end of said detent pistons communicating with the inner end of said pressure fluid passage; and, the outer end of said pressure fluid passage being aligned with a conduit connected to the pressure fluid inlet when the shuttle valve is in the central balanced position to conduct pressure fluid to the inner ends of the detent pistons to move them radially outwardly into detent engaging action with the groove in the detent housing chamber.

3. In a safety valve of the type having a pair of inlet pressure fluid chambers and a base provided with the pressure fluid inlet and in which is operatively mounted a shuttle valve including a spool provided with a centrally mounted valve head and a piston of equal area at each end for engagement by fluid under pressure provided by said fluid chambers, to maintain the shuttle valve in a central operative balanced position, said valve including an outlet closable by said valve head when it is moved from said balanced central position, a variable pressure detent means comprising, a detent housing connected to said base; an annular chamber in said detent housing having a groove in the wall thereof; an extension on one of said pistons projecting into said detent housing chamber; said piston and extension being provided with a pressure fluid passage; a plurality of radially disposed detent pistons slidably mounted in said piston extension and having the outer ends thereof engageable in said groove in said detent housing chamber wall; the inner end of said detent pistons communicating with the inner end of said pressure fluid passage; the outer end of said pressure fluid passage being aligned with a conduit connected to the pressure fluid inlet when the shuttle valve is in the central balanced position to conduct pressure fluid to the inner ends of the detent pistons to move them radially outwardly to detent engaging action with the groove in the detent housing chamber; and, a sealing means in said base on opposite sides of said conduit and engaging said one piston on opposite sides of the outer end of said pressure fluid passage when the shuttle valve is in a central operative balanced position.

No references cited.